(12) United States Patent
Tsumura et al.

(10) Patent No.: US 7,352,494 B2
(45) Date of Patent: Apr. 1, 2008

(54) PIXEL BLOCK DATA GENERATING DEVICE AND PIXEL BLOCK DATA GENERATING METHOD

(75) Inventors: Keiichi Tsumura, Hyogo (JP); Takahiro Iwasawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1011 days.

(21) Appl. No.: 10/607,307

(22) Filed: Jun. 27, 2003

(65) Prior Publication Data

US 2004/0100661 A1    May 27, 2004

(30) Foreign Application Priority Data

Jun. 28, 2002    (JP) .............................. 2002-191478

(51) Int. Cl.
H04N 1/00    (2006.01)
H04N 1/32    (2006.01)
H04N 1/40    (2006.01)

(52) U.S. Cl. ................. 358/426.05; 358/443; 358/442; 358/444

(58) Field of Classification Search ................ 358/443, 358/442, 444, 474, 426.05
See application file for complete search history.

(56) References Cited

FOREIGN PATENT DOCUMENTS

| JP | 8-18791 | 1/1996 |
|---|---|---|
| JP | 8-317225 | 11/1996 |
| JP | 10-341351 | 12/1998 |
| JP | 11-168610 | 6/1999 |
| JP | 11-312236 | 11/1999 |
| JP | 2000-354168 | 12/2000 |
| JP | 2002-137460 | 5/2002 |

OTHER PUBLICATIONS

Japanese Office Action issued in corresponding Japanese Patent Application No. JP 2002-191478, dated Oct. 24, 2006.

Primary Examiner—Houshang Safaipour
(74) Attorney, Agent, or Firm—McDermott Will & Emery LLP

(57) ABSTRACT

In order to reduce the capacity of a line memory when converting image data that are input in a raster scan order into pixel block data such as 8×8 pixels for JPEG compression and the like, data on the first 0th to 7th lines is written in an 8H line memory in a raster scan order. Next, while performing block reading, the writing of the next 8th to 15th lines is performed so as to follow the part that has been read. The block reading of the 8th to 15th lines is performed in an order from the area where the data on the 0th line was first stored to the area where the data on the 1st, 2nd . . . lines was stored. For this reason, the writing of the 16th to 23rd line that is performed simultaneously with the block reading of the 8th to 15th lines can be performed in the same manner as the writing of the first 0th to 7th lines. Therefore, block conversion can be performed using an 8H line memory capacity corresponding to 8 lines, whereas that corresponding to 16 lines has been conventionally required.

8 Claims, 8 Drawing Sheets

FIG. 4

| 896 | 768 | 640 | 512 | 384 | 256 | 128 | 0 |
|---|---|---|---|---|---|---|---|
| 897 | 769 | 641 | 513 | 385 | 257 | 129 | 1 |
| 898 | 770 | 642 | 514 | 386 | 258 | 130 | 2 |
| 899 | 771 | 643 | 515 | 387 | 259 | 131 | 3 |
| 900 | 772 | 644 | 516 | 388 | 260 | 132 | 4 |
| 901 | 773 | 645 | 517 | 389 | 261 | 133 | 5 |
| 902 | 774 | 646 | 518 | 390 | 262 | 134 | 6 |
| 903 | 775 | 647 | 519 | 391 | 263 | 135 | 7 |
| 904 | 776 | 648 | 520 | 392 | 264 | 136 | 8 |
| 905 | 777 | 649 | 521 | 393 | 265 | 137 | 9 |
| 906 | 778 | 650 | 522 | 394 | 266 | 138 | 10 |
| 907 | 779 | 651 | 523 | 395 | 267 | 139 | 11 |
| 908 | 780 | 652 | 524 | 396 | 268 | 140 | 12 |
| 909 | 781 | 653 | 525 | 397 | 269 | 141 | 13 |
| 910 | 782 | 654 | 526 | 398 | 270 | 142 | 14 |
| 911 | 783 | 655 | 527 | 399 | 271 | 143 | 15 |
| 912 | 784 | 656 | 528 | 400 | 272 | 144 | 16 |
| 913 | 785 | 657 | 529 | 401 | 273 | 145 | 17 |
| 914 | 786 | 658 | 530 | 402 | 274 | 146 | 18 |
| 915 | 787 | 659 | 531 | 403 | 275 | 147 | 19 |
| 916 | 788 | 660 | 532 | 404 | 276 | 148 | 20 |
| 917 | 789 | 661 | 533 | 405 | 277 | 149 | 21 |
| 918 | 790 | 662 | 534 | 406 | 278 | 150 | 22 |
| ⋮ | ⋮ | ⋮ | ⋮ | ⋮ | ⋮ | ⋮ | ⋮ |
| 953 | 825 | 697 | 569 | 441 | 313 | 185 | 57 |
| 954 | 826 | 698 | 570 | 442 | 314 | 186 | 58 |
| 955 | 827 | 699 | 571 | 443 | 315 | 187 | 59 |
| 956 | 828 | 700 | 572 | 444 | 316 | 188 | 60 |
| 957 | 829 | 701 | 573 | 445 | 317 | 189 | 61 |
| 958 | 830 | 702 | 574 | 446 | 318 | 190 | 62 |
| 959 | 831 | 703 | 575 | 447 | 319 | 191 | 63 |
| 960 | 832 | 704 | 576 | 448 | 320 | 192 | 64 |
| 961 | 833 | 705 | 577 | 449 | 321 | 193 | 65 |
| 962 | 834 | 706 | 578 | 450 | 322 | 194 | 66 |
| 963 | 835 | 707 | 579 | 451 | 323 | 195 | 67 |
| 964 | 836 | 708 | 580 | 452 | 324 | 196 | 68 |
| 965 | 837 | 709 | 581 | 453 | 325 | 197 | 69 |
| 966 | 838 | 710 | 582 | 454 | 326 | 198 | 70 |
| 967 | 839 | 711 | 583 | 455 | 327 | 199 | 71 |
| 968 | 840 | 712 | 584 | 456 | 328 | 200 | 72 |
| 969 | 841 | 713 | 585 | 457 | 329 | 201 | 73 |
| 970 | 842 | 714 | 586 | 458 | 330 | 202 | 74 |
| 971 | 843 | 715 | 587 | 459 | 331 | 203 | 75 |
| 972 | 844 | 716 | 588 | 460 | 332 | 204 | 76 |
| 973 | 845 | 717 | 589 | 461 | 333 | 205 | 77 |
| 974 | 846 | 718 | 590 | 462 | 334 | 206 | 78 |
| 975 | 847 | 719 | 591 | 463 | 335 | 207 | 79 |

Writing with first write addresses (e.g., 0 to 7 lines) (1st line to 8th line)

(8 pixels of image data is held in one area)

FIG. 5

Reading with first read addresses (e.g., 0 to 7 lines) — (1st line to 8th line) — (8 pixels of image data is held in one area)

| addr | c1 | c2 | c3 | c4 | c5 | c6 | c7 |
|---|---|---|---|---|---|---|---|
| 0 | 128 | 256 | 384 | 512 | 640 | 768 | 896 → |
| 1 | 129 | 257 | 385 | 513 | 641 | 769 | 897 → |
| 2 | 130 | 258 | 386 | 514 | 642 | 770 | 898 → |
| 3 | 131 | 259 | 387 | 515 | 643 | 771 | 899 → |
| 4 | 132 | 260 | 388 | 516 | 644 | 772 | 900 → |
| 5 | 133 | 261 | 389 | 517 | 645 | 773 | 901 → |
| 6 | 134 | 262 | 390 | 518 | 646 | 774 | 902 |
| 7 | 135 | 263 | 391 | 519 | 647 | 775 | 903 |
| 8 | 136 | 264 | 392 | 520 | 648 | 776 | 904 |
| 9 | 137 | 265 | 393 | 521 | 649 | 777 | 905 |
| 10 | 138 | 266 | 394 | 522 | 650 | 778 | 906 |
| 11 | 139 | 267 | 395 | 523 | 651 | 779 | 907 |
| 12 | 140 | 268 | 396 | 524 | 652 | 780 | 908 |
| 13 | 141 | 269 | 397 | 525 | 653 | 781 | 909 |
| 14 | 142 | 270 | 398 | 526 | 654 | 782 | 910 |
| 15 | 143 | 271 | 399 | 527 | 655 | 783 | 911 |
| 16 | 144 | 272 | 400 | 528 | 656 | 784 | 912 |
| 17 | 145 | 273 | 401 | 529 | 657 | 785 | 913 |
| 18 | 146 | 274 | 402 | 530 | 658 | 786 | 914 |
| 19 | 147 | 275 | 403 | 531 | 659 | 787 | 915 |
| 20 | 148 | 276 | 404 | 532 | 660 | 788 | 916 |
| 21 | 149 | 277 | 405 | 533 | 661 | 789 | 917 |
| 22 | 150 | 278 | 406 | 534 | 662 | 790 | 918 |
| ⋮ | ⋮ | ⋮ | ⋮ | ⋮ | ⋮ | ⋮ | ⋮ |
| 57 | 185 | 313 | 441 | 569 | 697 | 825 | 953 |
| 58 | 186 | 314 | 442 | 570 | 697 | 826 | 954 |
| 59 | 187 | 315 | 443 | 571 | 699 | 827 | 955 |
| 60 | 188 | 316 | 444 | 572 | 700 | 828 | 956 |
| 61 | 189 | 317 | 445 | 573 | 701 | 829 | 957 |
| 62 | 190 | 318 | 446 | 574 | 702 | 830 | 958 |
| 63 | 191 | 319 | 447 | 575 | 703 | 831 | 959 |
| 64 | 192 | 320 | 448 | 576 | 704 | 832 | 960 |
| 65 | 193 | 321 | 449 | 577 | 705 | 833 | 961 |
| 66 | 194 | 322 | 450 | 578 | 706 | 834 | 962 |
| 67 | 195 | 323 | 451 | 579 | 707 | 835 | 963 |
| 68 | 196 | 324 | 452 | 580 | 708 | 836 | 964 |
| 69 | 197 | 325 | 453 | 581 | 709 | 837 | 965 |
| 70 | 198 | 326 | 454 | 582 | 710 | 838 | 966 |
| 71 | 199 | 327 | 455 | 583 | 711 | 839 | 967 |
| 72 | 200 | 328 | 456 | 584 | 712 | 840 | 968 |
| 73 | 201 | 329 | 457 | 585 | 713 | 841 | 969 |
| 74 | 202 | 330 | 458 | 586 | 714 | 842 | 970 |
| 75 | 203 | 331 | 459 | 587 | 715 | 843 | 971 → |
| 76 | 204 | 332 | 460 | 588 | 716 | 844 | 972 → |
| 77 | 205 | 333 | 461 | 589 | 717 | 845 | 973 → |
| 78 | 206 | 334 | 462 | 590 | 718 | 846 | 974 → |
| 79 | 207 | 335 | 463 | 591 | 719 | 847 | 975 → |

PIXEL BLOCK DATA GENERATING DEVICE AND PIXEL BLOCK DATA GENERATING METHOD

BACKGROUND OF THE INVENTION

The present invention relates to methods and devices for performing block conversion of image data based on image signals that are input in a raster scan order in image input devices such as camera-equipped cellular phones and digital still cameras and obtaining image data in a rectangular area of, for example, 8 pixels×8 pixels.

In general, image data are output from imaging devices, such as CCD sensors and CMOS sensors, in the order in accordance with the scan of raster images. On the other hand, processing of digital images is in many cases performed for each pixel block in a rectangular area. More specifically, in the image data compression according to JPEG (Joint Photographic Coding Experts Group), for example, the processing is performed for each 8 horizontal pixels×8 vertical pixels of pixel block data. For this reason, after temporarily storing the image data output from an imaging device or the like in a memory, it is necessary to perform block conversion for reading each pixel block.

Conventionally, the above-described block conversion has been performed with, for example, a device as shown in FIG. 8. This device is provided with two 8H line memories 502 and 503 (each holding 8 scanning lines of image data) to which image data input in a raster scan order are input in an alternative manner via a selector 501. The writing area and the reading area for image data of each of these 8H line memories 502 and 503 are controlled by a write address control portion 504 and a read address control portion 505, respectively. The read image data are output via a selector 506.

The reason why the two 8H line memories 502 and 503 are provided as described above is to allow, while image data held in one of them is being read, subsequently input image data to be held in the other. That is, it is necessary to perform the reading of pixel block data after the image data up to the 8th line have been written. Therefore, if the image data on the 9th line that are subsequently input are written in the same 8H line memory, then the next image data are written in an area where image data have yet to be read out. For the sake of simple illustration, for example, let us assume that the reading of pixel block data is started from the image data at the left end of the 1st line immediately after completing the writing of all the 8 lines of image data. In this case, first, the image data at the left end of each of the 1 st to 8th lines are read out, and then the image data at the second pixel from the left end of the 1st line are read out in the ninth timing. However, since the writing of image data to be input is performed according to the scan order, in the area where the above-described image data at the second pixel from the left end of the 1 st line are held, new image data are written in the second timing after the start of the writing of the 9th line. Accordingly, the original image data are overwritten and can no longer be read in the above-described 9th timing. It should be noted that in the strict sense, it is also possible to start the reading of pixel block data a little before the completion of the writing of all the 8 lines of image data. In this case also, the above-described problem inevitably occurs, although in a slightly different timing.

For this reason, the two 8H line memories 502 and 503 have conventionally been provided as described above such that the image data that are input while reading is performed in one of the 8H line memories can be written in the other of the 8H line memories.

However, memories for holding image data, especially those having a large number of pixels, tend to increase a circuit scale as a whole, so that the conventional devices have the problem of high manufacturing costs due to large chip areas of LSIs.

SUMMARY OF THE INVENTION

Therefore, with the foregoing in mind, it is an object of the present invention to decrease the memory capacity necessary for block conversion to a low level, thereby making it possible to reduce circuit scales and manufacturing costs.

The above-described object is achieved in accordance with a first aspect of the present invention by providing a pixel block data generating device for successively outputting, for each of pixel blocks that is a predetermined rectangular area in an image, pixel block data constituted by image data of pixels constituting the each of the pixel blocks, based on image data of pixels constituting the image that are input in an raster scan order, the pixel block data generating device comprising:

a memory for holding the image data that have been input;

a writing control portion for writing the image data in the memory;

a reading control portion for successively reading the pixel block data from the memory for the each of the pixel blocks and outputting that pixel block data, wherein the writing control portion performs control in such a manner that the image data that have been newly input can be written in an area of the memory where the image data for pixels that are only a part of pixels on a line out of a plurality of lines each constituted by pixels in a scanning line direction in the image were read.

The present invention provides, in a second aspect thereof, a pixel block data generating device according to the first aspect, wherein the writing control portion and the reading control portion output a write address and a read address for the memory, respectively, thereby controlling a writing area and a reading area of the image data, respectively.

With the pixel block data generating device according to the first or the second aspect, even when all the image data on each line have not been read, it is possible to write new image data by utilizing an areas where a part of the image data on each line have already been read, thereby decreasing a memory capacity to a low level. Such control of the writing and reading areas can be readily performed by address control.

The present invention provides, in a third aspect thereof, a pixel block data generating device according to the first aspect, wherein, when a number of pixels on one line in a scanning line direction in the image is h (h is a natural number), the pixel block that is a predetermined rectangular area is a pixel block constituted by n pixels in the scanning line direction and m pixels in a direction perpendicular to the scanning line (n and m are natural numbers), the writing control portion and the reading control portion control a writing operation and a reading operation so as to repeatedly perform:

a first writing operation of writing m lines of image data in a predetermined area of the memory in a predetermined order;

a first reading operation of successively reading the written image data for the each of the pixel blocks including n pixels that are adjacent to one another in the scanning line direction, after the first writing operation is performed;

a second writing operation of writing image data for each line in m lines of image data that are subsequent to the m lines of image data written in the first writing operation in the area of the memory where image data of each (h/m)/n pixel blocks have been read in the scanning line direction; and a second reading operation of successively reading the written image data for the each of the pixel blocks including n pixels that are adjacent to one another in the scanning line direction, after the second writing operation is performed.

With the pixel block data generating device according to the third aspect, a part of image data of each of the lines is written in an area where one line of image data was written when the writing of the m lines that are directly before the lines was performed, so that it is possible to complete the reading from that area early.

More specifically, in the first writing operation, writing is performed in the order as shown in FIG. 4. Here, the cells in FIG. 4 each represent an area where 8 pixels of image data are held, and the numbers in the cells each represent the address of the area. Additionally, in this example, the number of pixels (h) for one line is 640, and image data of 80 pixel blocks of 8×8 (n×m) pixels are successively read for each 8 lines of data.

For the first writing operation described above, reading is performed in the order as shown in FIG. 5 in the first reading operation. That is, the image data of 8 pixels at the left ends of the 1st to 8th lines (the image data held in the areas with addresses 0, 128, 256, . . . , 896) are read, so that the image data of the pixel blocks at the left ends are read. Similarly, the image data held in the areas with addresses 1, 129, 257, . . . , 897 are read, so that the image data of the pixel blocks at the second to the left ends are read.

When the image data of (h/m)/n=(640/8)/8=10 pixel blocks have been read in the above-described manner, the areas with addresses 0 to 9, 128 to 137, . . . , 896 to 905 are in a state where a new image data can be written in them. Accordingly, the image data on the 9th line can be written in the second writing operation in the order as shown in FIG. 6. Thereafter, as the first reading operation proceeds, the second writing operation is performed in the same manner.

It is also possible to read the image data of each of the pixel blocks by reading the image data written in the above-described second writing operation in the order as shown in FIG. 7. Furthermore, by thereafter repeating the first writing operation and the above-described operations performed after that, it is possible to perform an appropriate block conversion by using memory areas corresponding to only 8 lines.

The present invention also provides, in a fourth aspect, a pixel block data generating device according to the third aspect, wherein the writing control portion performs control in the second writing operation in such a manner that image data of each subsequent line are written for each area where a part of image data of each line of the m lines written in the first writing operation in the area of the memory where image data of each (h/m)n pixel blocks have been read in the scanning line direction in the same order as that in which writing was performed in the first writing operation.

With the pixel block data generating device according to the fourth aspect, it is possible to readily perform the reading of the blocks in the same order as the reading for the image data of the pixel blocks on the m lines that are directly before the lines, and complete the above-described reading from a predetermined area early.

The present invention provides, in a fifth aspect thereof, a pixel block data generating device according to the third aspect, wherein the reading control portion performs control in the reading operations in such a manner that image data for the each of the pixel blocks are successively read in an order of the pixel blocks that are adjacent to one another in the scanning line direction.

With the pixel block data generating device according to the fifth aspect, it is possible to facilitate the processing of the device in the next stage that performs processing using the output pixel block data.

The present invention provides, in a sixth aspect thereof, a pixel block data generating according to the fifth aspect, wherein the writing control portion and the reading control portion output a write address and a read address for the memory, respectively, thereby controlling a writing area and a reading area of the image data, respectively, and wherein, in the writing control portion, the predetermined area in the memory in which each line of image data are written in the first writing operation is an area with continuous addresses or addresses that are offset from one another by a predetermined number.

With the pixel block data generating device according to the sixth aspect, it is possible to decrease the types of orders of the addresses to be generated, thereby readily simplifying the configuration of the control portions and reducing the circuit scales of the control portions.

The present invention also provides, in a seventh aspect thereof, a pixel block data generating device according to the sixth aspect, wherein the area of the memory in which image data of the corresponding pixels on the each line is written is an area with addresses that are offset from one another by a power of 2 in the first writing operation.

With the pixel block data generating device according to the seventh aspect, it is possible to generate addresses with the bits of the addresses being separated, so that it is also possible to simplify the configuration of the control portions and reducing their circuit scales.

The present invention provides, in an eighth aspect thereof, a pixel block data generating device according to the first aspect, wherein a shift of at least one of a position in which image data of each of the pixels are written and a position in which the image data of each of the pixels are read in the memory can be set in a variable manner.

With the pixel block data generating device according to the eighth aspect, it is possible to readily perform a flexible block conversion.

The present invention provides, in a ninth aspect thereof, a block data generating device according to the first aspect, wherein at least one of a starting timing of writing of the image data in the memory and a timing of reading of the image data from the memory can be set in a variable manner.

With the pixel block data generating device according to the ninth aspect, it is possible to readily perform an appropriate block conversion in accordance with the writing speed or reading speed.

The present invention provides, in a tenth aspect thereof, a pixel block data generating device comprising a plurality of the pixel block data generating devices according to the first aspect, wherein, based on image data of a plurality of images that are input in a time-sharing system, pixel block data for each of the images can be output.

With the pixel block data generating device according to the tenth aspect, it is possible to readily perform block conversion for, for example, the luminance signals and the color signals in a color image.

The present invention also provides, in an eleventh aspect thereof, a pixel block data generating device for successively outputting, for each of pixel blocks that is a predetermined rectangular area constituted by n pixels in a scanning line direction and m pixels in a direction perpendicular to the scanning line (n and m are natural numbers), pixel block data constituted by image data of pixels constituting the each of the pixel blocks, based on image data of pixels in an image whose number of pixels in the scanning line direction is h (h is a natural number) that are input in an raster scan order, the pixel block data generating device comprising:

a memory for holding image data of pixels in a range smaller than 2×h×m;

a writing control portion for writing the input image data in the memory; and a reading control portion for successively reading the pixel block data from the memory and outputting that pixel block data, wherein the writing control portion performs control in such a manner that new image data are written in an area in the memory where the written image data have already been read.

With the pixel block data generating device according to the eleventh aspect, even when all the image data on each line have not been read, it is possible to write new image data by utilizing an area that has already been read, thereby enabling block conversion with a memory capacity that holds image data of pixels in an range smaller than 2×h×m at most. This makes it possible to reduce a hardware scale.

Furthermore, the present invention provides, in a twelfth aspect thereof, a pixel block data generating method for successively outputting, for each of pixel blocks that is a predetermined rectangular area in an image, pixel block data constituted by image data of pixels constituting the each of the pixel blocks, based on image data of pixels constituting the image that are input in an raster scan order, using a memory for temporarily holding image data, wherein writing and reading in the memory are controlled in such a manner that the image data that have been newly input can be written in an area of the memory where the image data for pixels that are only a part of pixels on a line out of a plurality of lines each constituted by pixels in a scanning line direction in the image were read after the image data were written in the memory.

With the pixel block data generating method according to the twelfth aspect, even when all the image data on each line have not been read as described above, it is possible to write new image data by utilizing an area that has already been read, thereby reducing a memory capacity.

BRIEF DESCRIPTION OF THE DRAWINGS

FIG. 4 is a diagram showing a writing order with first write addresses.

FIG. 5 is a diagram showing a reading order with first read addresses.

FIG. 6 is a diagram showing a writing order with second write addresses.

FIG. 7 is a diagram showing a reading order with second read addresses.

DETAILED DESCRIPTION OF THE INVENTION

Hereinbelow, preferred embodiments of the present invention are described with reference to the appended drawings.

Figure 1:
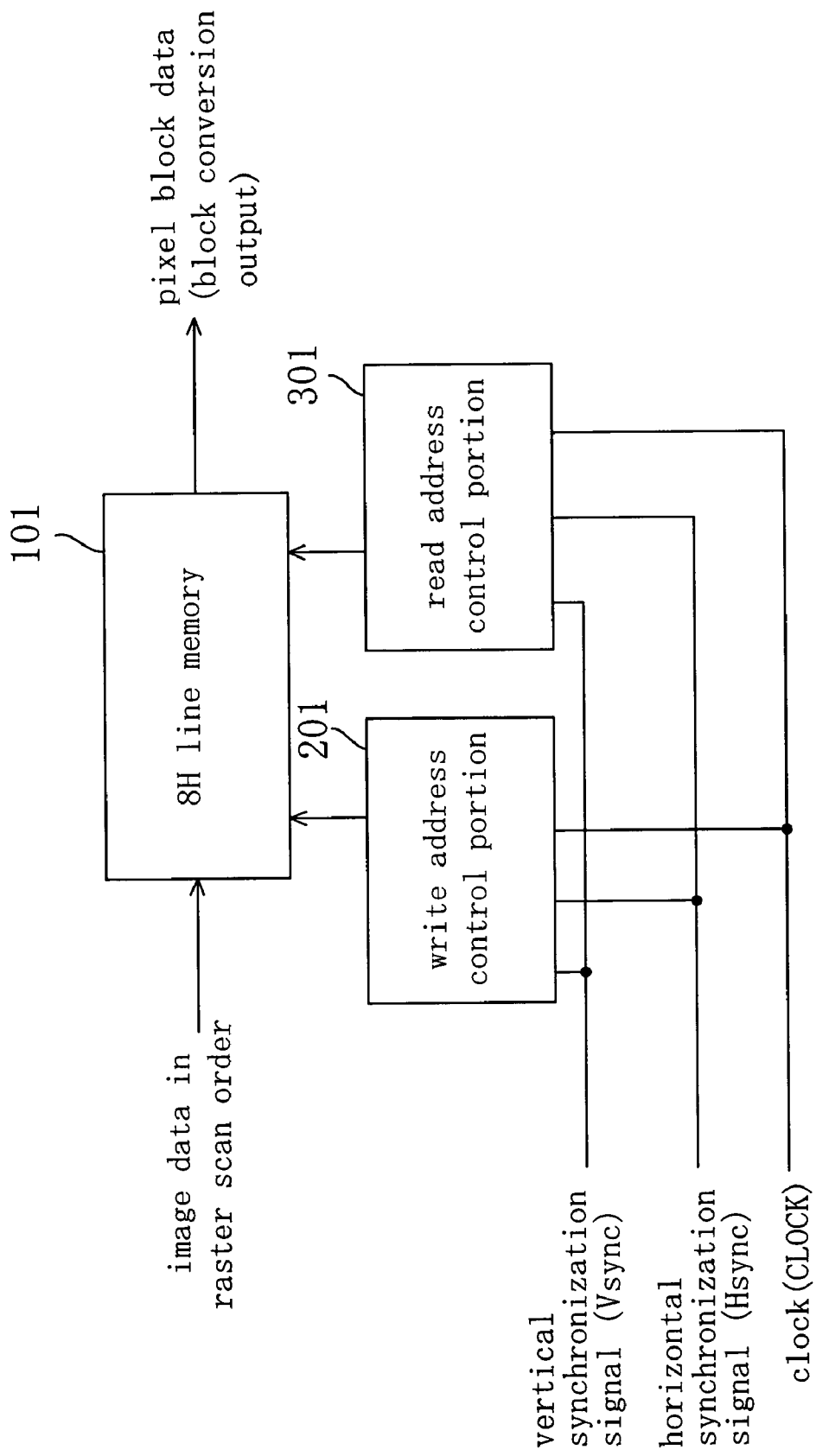
FIG. 1 is a block diagram showing the configuration of a pixel block data generating device according to an embodiment of the present invention.

FIG. 1 is a block diagram showing the configuration of a pixel block data generating device according to an embodiment of the present invention. As shown in FIG. 1, the pixel block data generating device is provided with one 8H line memory 101 for temporarily holding image data that are input in a raster scan order, a write address control portion 201 and a read address control portion 301. (It should be noted that in the case of using as the 8H line memory 101, one that cannot simultaneously write and read out image data, i.e., one in which addresses are commonly input for writing and reading, a selector that selectively switches between the output of the write address control portion 201 and the output of the read address control portion 301 and inputs the output into the 8H line memory 101 may be additionally provided).

The 8H line memory 101 includes, for example, 80×8 memory areas specified by addresses (in decimal notation) as shown in FIG. 4. Therefore, assuming for example that the data bus width is 64 bits and the image data of one pixel is 8 bits, 8 pixels of image data can be stored in each memory area, and a total of (8×80=640 pixels)×8 lines of image data can be held. Although the addresses are discontinuous (e.g., addresses 80 to 127 are not present) in the example shown in FIG. 4, it is possible to facilitate address control by setting the addresses such that the addresses of the memory areas at the left end of FIG. 4 differ from each other by a power of 2 (are integer multiples of a power of 2) in this manner. In addition, even when the addresses are set as above, it is not necessary to actually provide any memory device for the portion corresponding to addresses, for example, 80 to 127 if the number of pixels in the image to be processed is 640 or less as in the above-described example.

Figure 2:
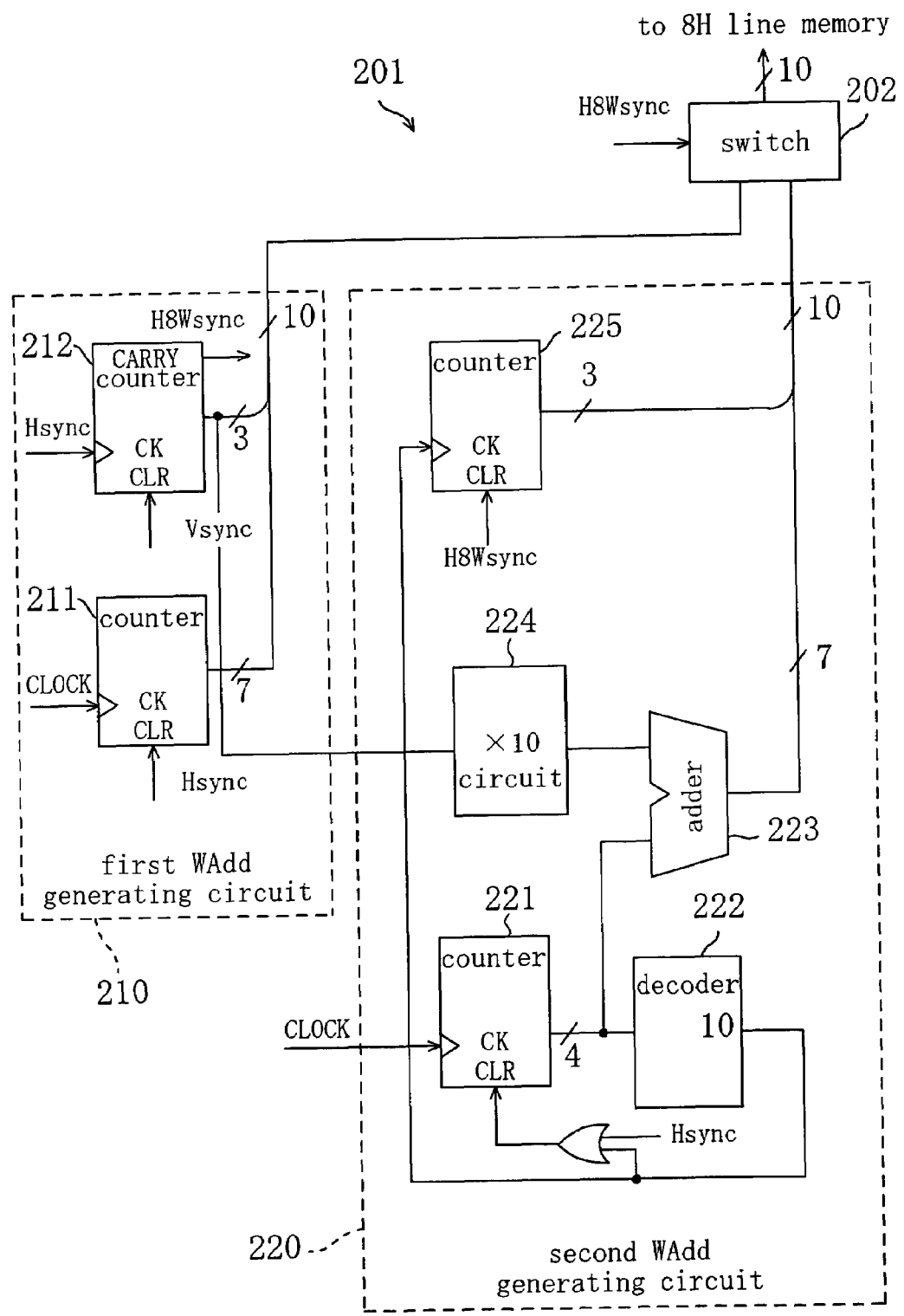
FIG. 2 is a circuit diagram showing a specific configuration of a write address control portion 201.
Figure 6:
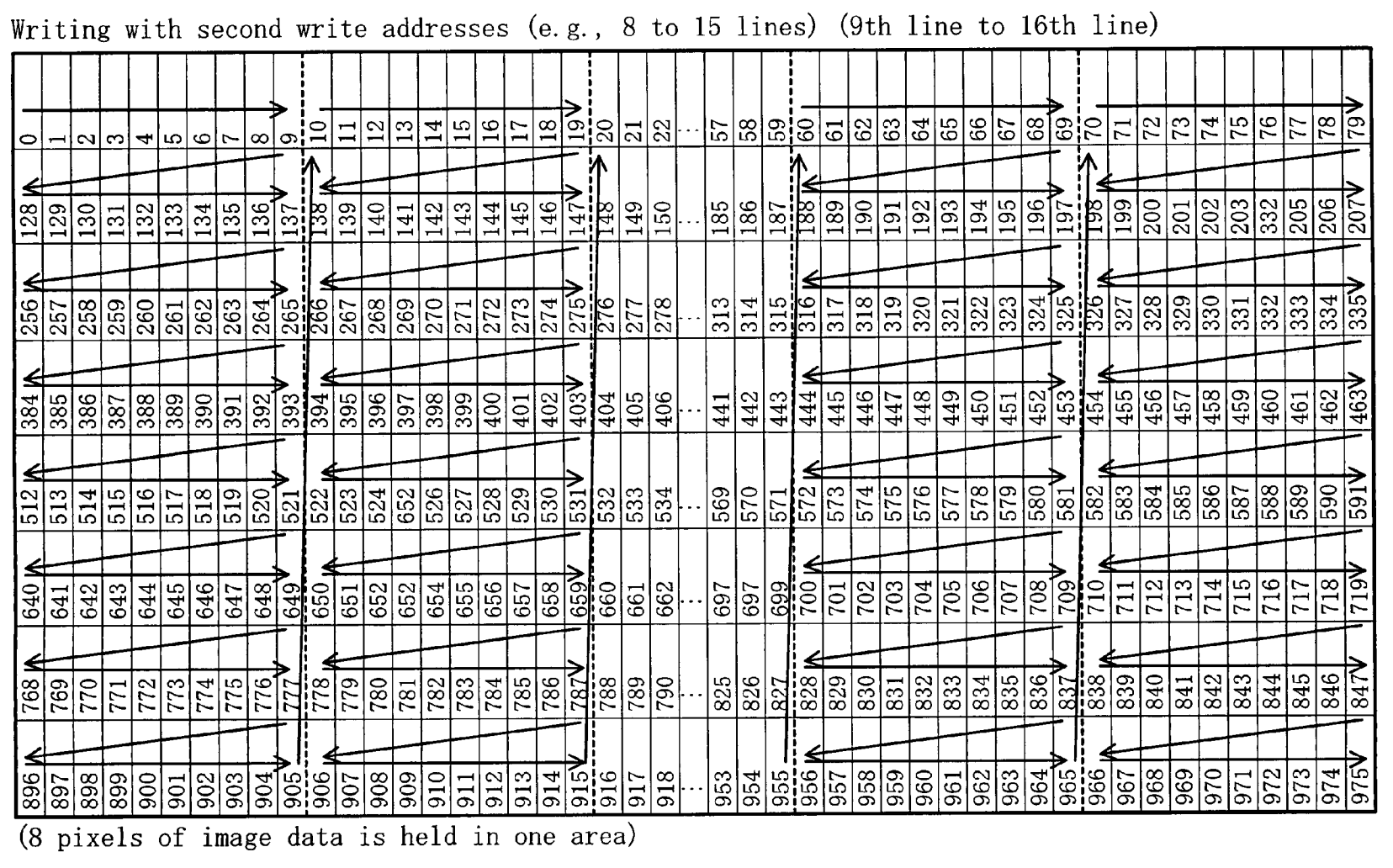

As shown in FIG. 2, the write address control portion 201 is provided with, for example, a first WAdd generating circuit 210, a second WAdd generating circuit 220 and a switch 202 for switching between the outputs of these circuits at each time of input of a synchronization signal (H8Wsync) that is generated each time 8 lines of image data are written as described below. The first WAdd generating circuit 210 is provided with two counters 211 and 212, and generates first write addresses in the order as shown in FIG. 4 as specifically described below. The second WAdd generating circuit 220 is provided with a counter 221, a decoder 222, an adder 223, a ×10 multiplication circuit 224 and a counter 225, and generates second write addresses in the order as shown in FIG. 6.

Figure 3:
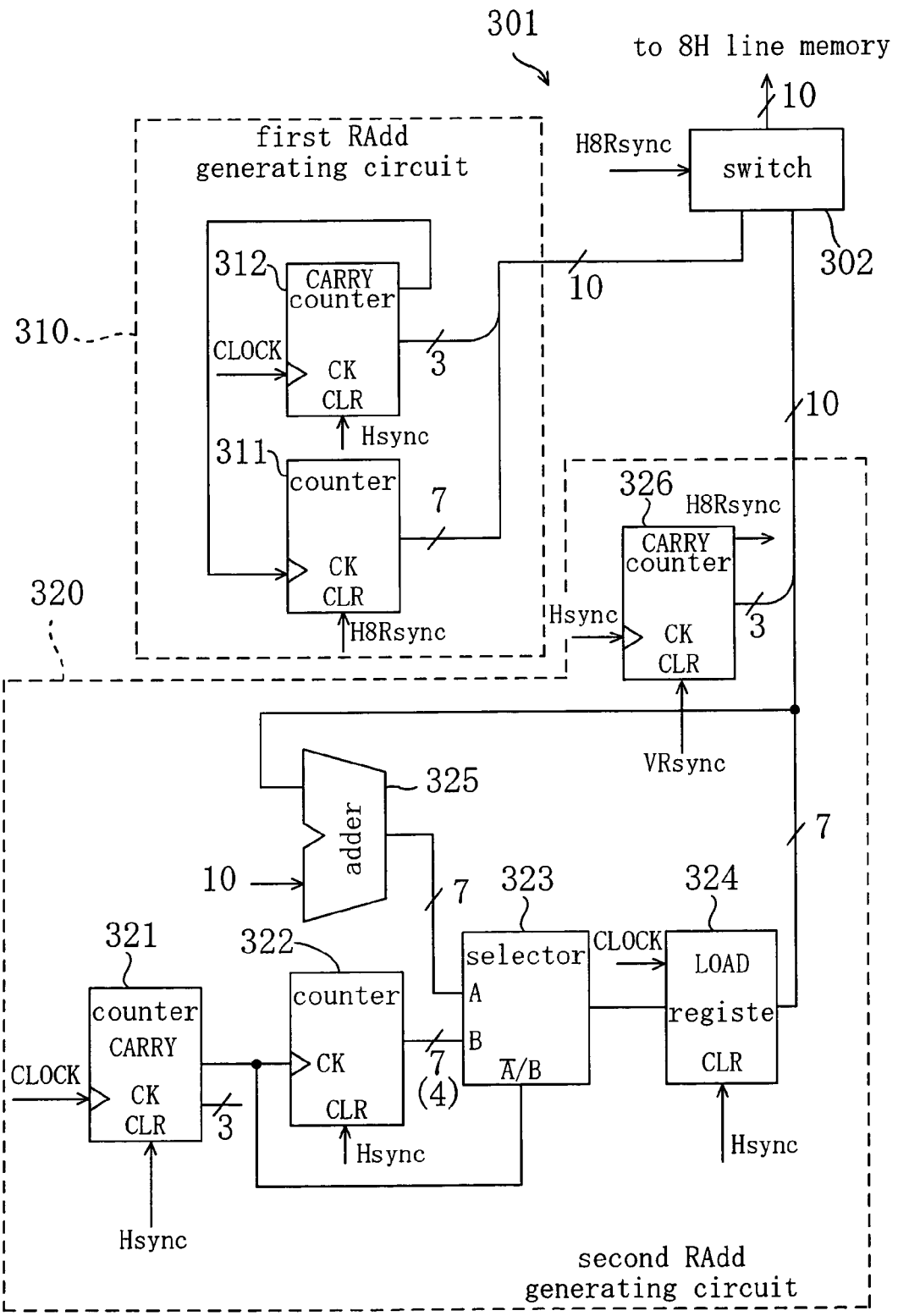
FIG. 3 is a circuit diagram showing a specific configuration of a read address control portion 301.
Figure 7:
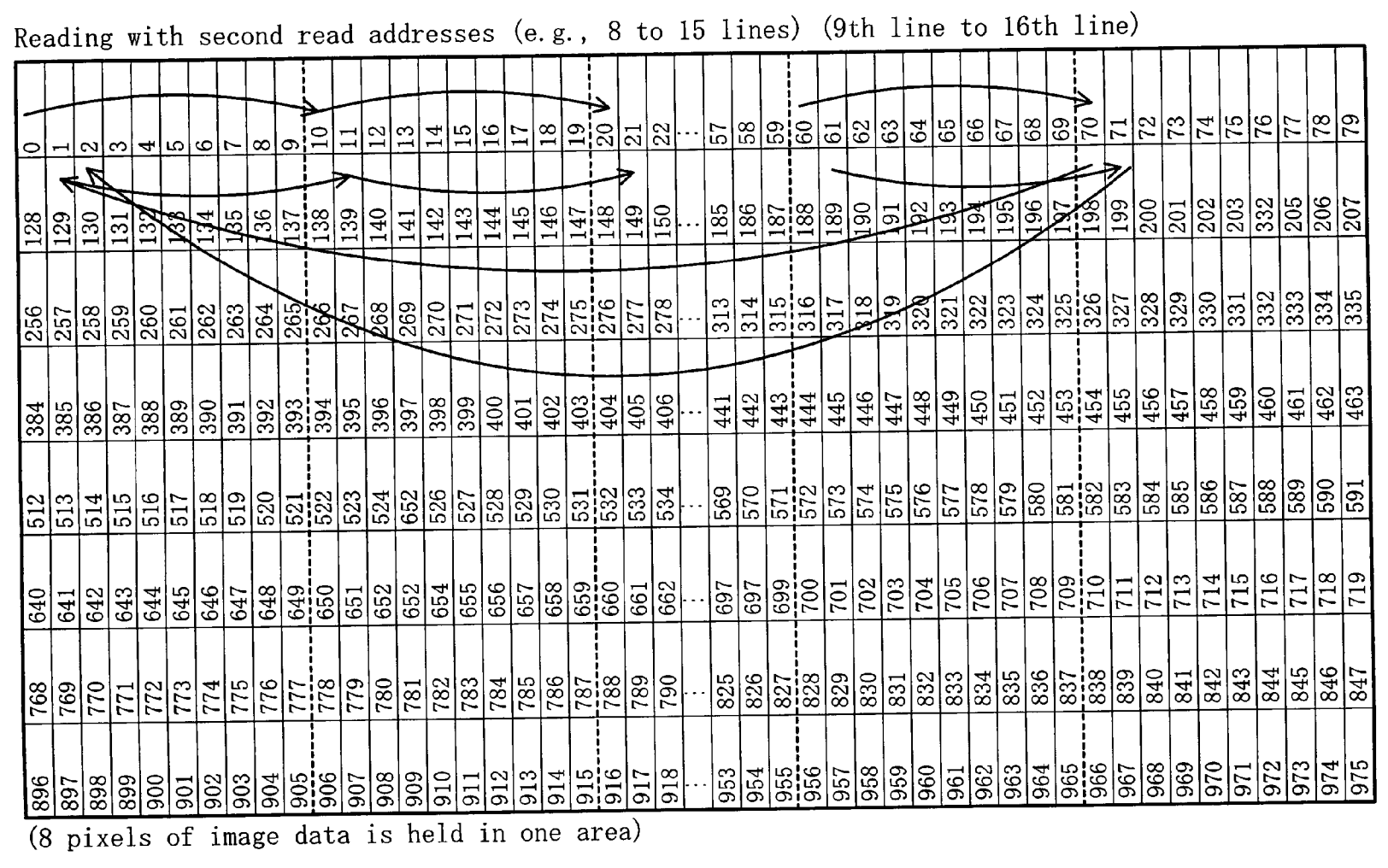
Figure 8:
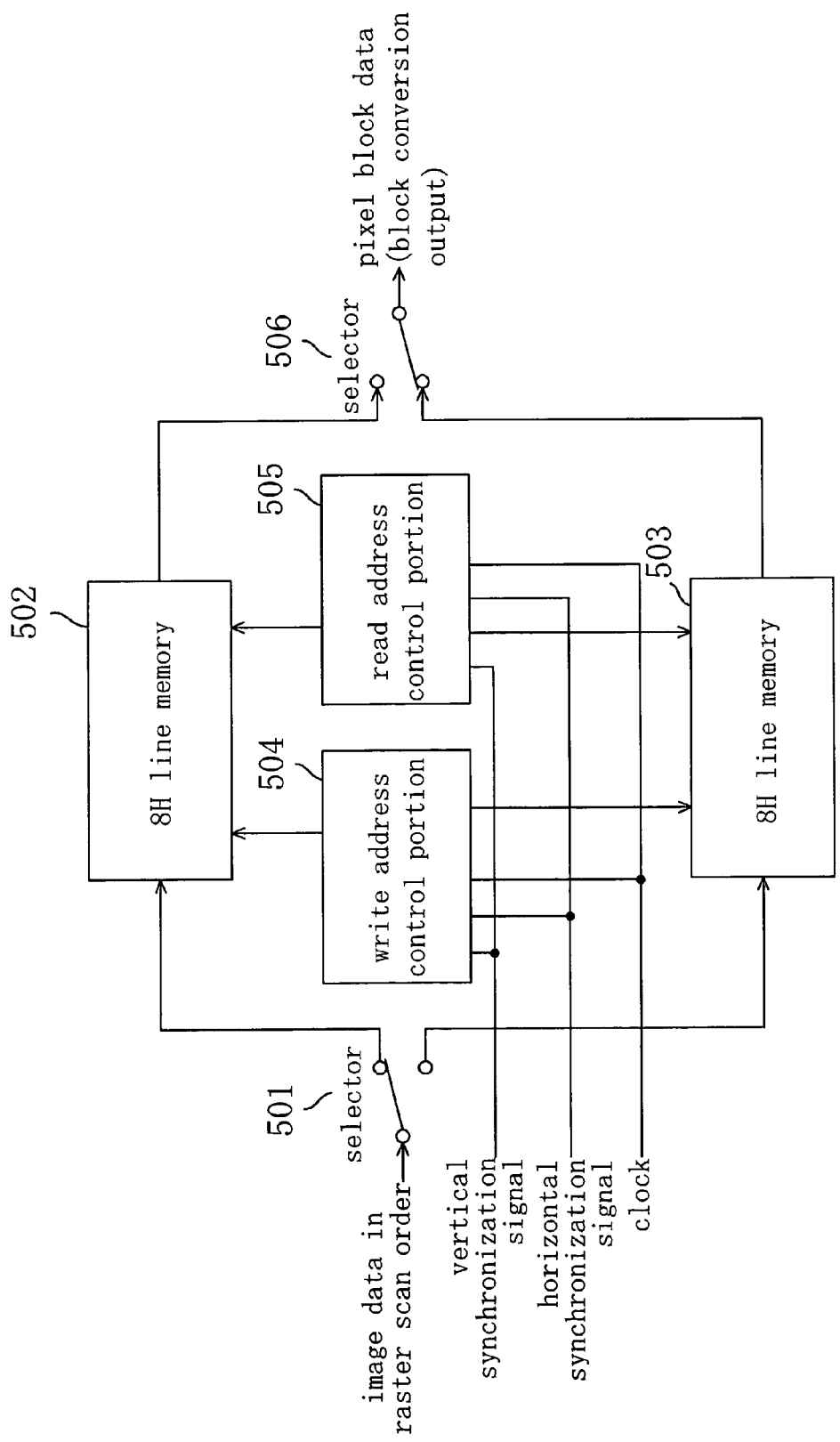
FIG. 8 is a block diagram showing the configuration of a conventional pixel block data generating device.

As shown in FIG. 3, the read address control portion 301 is provided with, for example, a first RAdd generating circuit 310, a second RAdd generating circuit 320 and a switch 302 for switching between the outputs of these circuits at each time of a synchronization signal (H8Rsync) that is generated each time 8 lines of image data are read out. The first RAdd generating circuit 310 is provided with counters 311 and 312, and generates first read addresses in the order as shown in FIG. 5. The second RAdd generating circuit 320 is provided with counters 321 and 322, a selector 323, a register 324, an adder 325 and a counter 326, and generates second read addresses in the order as shown in FIG. 7. In addition, for example, the write address control portion 201 and the read address control portion 301 further output writing signals or reading signals for the 8H line memory 101.

Next, the orders of writing and the reading of image data input to the above-described pixel block data generating device are described.

Writing of 8 Lines with First Write Addresses

First, 8 lines of image data that corresponds to the 0th to 7th line of image data to be input are written in the 8H line memory 101 in the order as shown in FIG. 4, in accordance with the write addresses generated by the first WAdd generating circuit 210 of the write address control portion 201. More specifically, the counter 211 repeatedly generates addresses of the least significant 7 bits of 0 to 79 that are incremented in accordance with a clock signal each time a horizontal synchronization signal (Hsync) is input, whereas the counter 212 generates addresses of the most significant 3 bits of 0, 128, . . . 768, 896 that are incremented each time Hsync is input (or each time the output of the counter 211 becomes 80), and image data are written in the areas corresponding to the addresses of these 10 bits. In this case, one line of image data are held in 80 horizontal areas×1 vertical area shown in FIG. 4. That is, 8 pixels of image data are held in one area as described above, so that 8×80=640 pixels=one line of image data are held in the above-described 80 areas.

Reading of 8 Lines with First Read Addresses

The image data written in the above-described manner are read out in the order as shown in FIG. 5, in accordance with the read addresses generated by the first RAdd generating circuit 310 of the read address control portion 301. More specifically, the counter 312 generates addresses of the most significant 3 bits of 0, 128, . . . 768, 896 that are incremented each time a clock signal is input, whereas the counter 311 generates addresses of the least significant 7 bits of 0 to 79 that are incremented each time a carry signal is output from the counter 312, and the image data are read from the areas corresponding to the addresses of these 10 bits. Consequently, 8 pixel of image data are stored in each memory area as described above, so that when the image data stored in the areas with, for example, addresses 0, 128, . . . 768, 896 are read, 8 horizontal pixels×8 vertical pixels of pixel block data are read out. Here, the timing of starting the reading of the above-described image data may be set such that reading is started approximately when the first image data on the 8th line (address 896) are written, in the case where, for example, the writing speed and the reading speed are the same (are carried out based on the same clock signal) as shown in FIG. 5. (More precisely, reading may also be started during a time in which the write address is, for example, 841 to 914, but, it is in general easy to control the start of reading with the above-described timing).

Writing of 8 Lines with Second Write Addresses

If all the image data on the 8th line are written when the reading of image data is performed in the above-described manner, the image data on the 9th line that are subsequently input are written in the order as shown in FIG. 6, in accordance with the write addresses generated by the second WAdd generating circuit 220 of the write address control portion 201. More specifically, in the case where reading is started simultaneously with the start of the writing of the image data on the 8th line as described above, the image data held in the areas with addresses 10 to 79 out of the image data on the first line have yet to be read when the writing of the image data on the 9th line is started. However, the reading of the image data written in the areas at the left end of FIG. 6 to the areas with addresses 9, 137, . . . 777, 905 has been completed, so that the image data that have yet to be read will not be damaged through the writing of all the image data on the 9th line if the writing is performed in the areas in the order as shown in FIG. 6. The operation of the second WAdd generating circuit 220 for generating the above-described write addresses is briefly explained. The counter 221 outputs a 4-bit value that is incremented in accordance with a clock signal, and is reset by the decoder 222 each time the value becomes 10, so that it repeatedly outputs values from 0 to 9. The adder 223 adds the above-described values of 0 to 9 and values of 0 to 70, obtained by multiplying values 0 to 7 of the counter 212 (the values that are incremented each time Hsync is generated) by 10, with the ×10 multiplication circuit 224. More specifically, the adder 223 repeatedly outputs each value of 0 to 9 eight times first, and thereafter, when Hsync is input, repeatedly outputs each value of 10 to 19, obtained by adding 10 to these values eight times. This value is output as the addresses of the least significant 7 bits. The counter 225 generates addresses of the most significant 3 bits of 0, 128, . . . 768, 896 that are incremented each time the value output from the counter 221 becomes 10 (in accordance with the signals output from the decoder 222), and image data are written in the areas corresponding to the addresses of these 10 bits. In this case, one line of image data are held in 10 horizontal areas×8 vertical areas shown in FIG. 6. (The value 10 of the horizontal areas is a value obtained by dividing the number of pixel 640 of the image in the horizontal direction with the number of pixels 8 corresponding to one memory area and the number of pixel 8 of one side of a pixel block, or a value obtained by dividing the number of areas 80 in the horizontal direction with the number of pixels 8 of one side of a pixel block).

Reading of 8 Lines with Second Read Addresses

Next, the image data written in the above-described manner are then read out in the order as shown in FIG. 7, in accordance with the read addresses generated by the second RAdd generating circuit 320 of the read address control portion 301. More specifically, the register 324 and the counter 326 are reset by Hsync and VRsync (a reading synchronization signal that is delayed by 7 lines from a vertical synchronization signal Vsync), respectively, and output a 10-bit address having a value of 0. At this time, the value output from the register 324 is added with 10 by the adder 325, and input to the selector 323. On the other hand, the counter 321 outputs a carry signal each time a clock signal is input eight times, and the counter 322 counts carry signals and outputs this value. The selector 323 selectively outputs the output of the counter 322 when a carry signal is output, and selectively outputs the value output from the adder 325 in the other cases. That is, the selector 323 selectively outputs the value output from the adder 325 between the time when Hsync is input for the first time and the time when a clock signal is input eight times, and that value is held in the register 324, being synchronized with a clock signal. Therefore, the register 324 outputs values of 0, 10, 20, . . . 70 as addresses of the least significant 7 bits for each clock, and outputs these and 3 bits having a value of 0 that are first output from the counter 326 as the addresses of 10 bits. Consequently, the first 8 pixels of image data on the 9th to 16th lines (the pixel block data of the pixel blocks on the left end) are read.

Then, as described above, a carry signal is output from the counter 321 when the 8th clock is input, so that the value output from the counter 322 is incremented to be 1, and that value is selected by the selector 323 and input to the register 324. Therefore, at and after the 9th clock, values of 1, 11, 21, . . . 71 that are incremented by 10 are output as addresses of the least significant 7 bits, and the pixel block data of the pixel blocks at the second from the left end in the image are output. Similarly, the pixel block data of the next pixel blocks are read each time 8 clocks are input Thereafter, for each 80th clock, for example, the counter 321 that outputs addresses of the least significant 7 bits is initialized, and addresses of the most significant 3 bits output from the counter 326 are incremented, in accordance with Hsync, so that the pixel block data in the areas with addresses 128, 138, . . . 198, etc., are similarly read.

When reading is performed in the above-described manner, the reading of image data is completed for each of the sets of areas with addresses 1 to 79, 128 to 207 . . . , so that the writing of the next 8 lines of image data can be started in the same manner as described with regard to the writing with the first write addresses, without damaging the image data that have yet to be read. Accordingly, by thereafter repeating writing and reading in the same manner, it is possible to perform block conversion, simply using the 8H line memory 101 having a capacity corresponding to 8 lines, It should be noted that the differentiation between the first and second write addresses and between the first and second read addresses are made for the sake of convenience, and exactly the same output can also be obtained when block conversion is started with the second write addresses and the second read addresses.

Although writing and reading are performed in synchronization with each other in the above-described example, they are not necessarily in synchronization, and for example, reading may be discontinuously performed at a speed twice that of writing. Alternatively, when writing and reading are not in synchronization, but the difference in timing or speed between them is within a certain range, for example, a clock signal or synchronization signal may be delayed as specified by a register and the like such that no erroneous operation occurs. Writing and reading may be carried out at any time when they can be performed. Such control of writing and reading can be readily performed by, for example, providing a counter that is incremented each time writing is performed and decremented each time reading is performed, and determining whether the values of the counter are within a predetermined range.

The orders of writing and reading are not limited to the above-described ones, and it is possible to decrease a memory capacity to a low level as long as writing can be performed in areas that have already been read without any problem. That is, in the case of FIG. 6, for example, writing may be performed in the same order as the reading order shown in FIG. 5. In this case, the second WAdd generating circuit 220 can be omitted, but, on the other hand, if each pixel block data is to be output in the above-described order of adjacent pixel blocks, the subsequent address generation is rendered complicated. However, the combinations of the orders of addresses in accordance with the principal of the present invention are finite, so that it is certainly possible to repeat writing and reading with the repetition of a series of addresses. When the subsequent process is not hindered by changing the above-described order of pixel blocks, it is possible to complete the reading of image data of each of the sets of areas with addresses 1 to 79, 128 to 207 . . . as in the reading in the case of FIG. 7, by performing the writing in the same order as the reading order shown in FIG. 5.

The block conversion is not limited to that of pixel blocks including the above-described pixels at the left end, and it is also possible to readily perform block conversion of a rectangular area in a given position by, for example, pre-loading the initial value of each counter, offsetting the addresses generated in the above-described manner or masking a clock signal to partially discard the image data.

The sizes of the entire image or pixel block (the numbers of vertical and horizontal pixels) and their aspect ratios are not limited to the above-described ones, and similar effects can be also achieved with various other sizes. Moreover, these may be set in a variable manner within the range of the memory capacity.

Although 8 pixels of image data are held in one area in the 8H line memory 101 in the above-described examples, the present invention is not limited thereto and the same principle can also be applied to, for example, a case where one pixel of image data are held in one area.

Although block conversion is performed for a single image in the above-described examples, the conversion may be performed for a plurality of images such as color images. More specifically, when luminance signals and color signals are input in a time-sharing system, for example, 8H line memories 101 corresponding to the respective signals may be provided and the same process may be performed.

When a plurality of image data such as 8 pixels of image data are held in one area as described above, an 8H line memory that can perform a simultaneous processing of the lines in which the image data of a part of the pixels held in each area and the image data of a part of the pixels held in another area are read (i.e., the image data of, for example, the pixels at the left end of each line are read) may be used as the 8H line memory 101.

As described above, according to the present invention, it is possible to set the orders of writing areas and reading areas in such a manner that writing is performed in areas that have already been read, thereby decreasing the memory capacity necessary for block conversion to a low level and reducing circuit scales and manufacturing costs.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A pixel block data generating device for successively outputting pixel block data for each of pixel blocks that is a predetermined rectangular area in an image, said pixel block data including pixels of image data, the pixel block data generating device comprising:
   a memory for holding image data that have been input;
   a writing control portion for writing the image data in the memory;
   a reading control portion for successively reading the pixel block data from the memory for the each of the pixel blocks and outputting that pixel block data,
   wherein the writing control portion performs control in such a manner that the image data that have been newly input can be written in an area of the memory where the image data for pixels that form a portion of pixels of a given line of a plurality of lines are stored, each of said plurality of lines defined by pixels extending in a scanning line direction, and wherein, when a number of pixels on one line in a scanning line direction in the image is h (h is a natural number), the pixel block that is a predetermined rectangular area is a pixel block constituted by n pixels in the scanning line direction and m pixels in a direction perpendicular to the scanning line (n and m are natural numbers), the writing control portion and the reading control portion control a writing operation and a reading operation so as to repeatedly perform:

a first writing operation of writing m lines of image data in a predetermined area of the memory in a predetermined order;

a first reading operation of successively reading the written image data for the each of the pixel blocks including n pixels that are adjacent to one another in the scanning line direction, after the first writing operation is performed;

a second writing operation of writing image data for each line in m lines of image data that are subsequent to the m lines of image data written in the first writing operation in the area of the memory where image data of each (h/m)/n pixel blocks have been read in the scanning line direction; and a second reading operation of successively reading the written image data for the each of the pixel blocks including n pixels that are adjacent to one another in the scanning line direction, after the second writing operation is performed.

2. The pixel block data generating device according to claim 1, wherein the writing control portion performs control in the second writing operation in such a manner that image data of each subsequent line are written for each area where a part of image data of each line of the m lines written in the first writing operation in the area of the memory where image data of each (h/m)n pixel blocks have been read in the scanning line direction in the same order as that in which writing was performed in the first writing operation.

3. The pixel block data generating device according to claim 1, wherein the reading control portion performs control in the reading operations in such a manner that image data for the each of the pixel blocks are successively read in an order of the pixel blocks that are adjacent to one another in the scanning line direction.

4. The pixel block data generating device according to claim 3, wherein the writing control portion and the reading control portion output a write address and a read address for the memory, respectively, thereby controlling a writing area and a reading area of the image data, respectively, and wherein, in the writing control portion, the predetermined area in the memory in which each line of image data are written in the first writing operation is an area with continuous addresses or addresses that are offset from one another by a predetermined number.

5. The pixel block data generating device according to claim 4, wherein the area of the memory in which image data of the corresponding pixels on the each line is written is an area with addresses that are offset from one another by a power of 2 in the first writing operation.

6. The pixel block data generating device according to claim 1, wherein a shift of at least one of a position in which image data of each of the pixels are written and a position in which the image data of each of the pixels are read in the memory can be set in a variable manner.

7. The pixel block data generating device according to claim 1, wherein at least one of a starting timing of writing of the image data in the memory and a timing of reading of the image data from the memory can be set in a variable manner.

8. A pixel block data generating device comprising a plurality of the pixel block data generating devices according to claim 1, wherein, based on image data of a plurality of images that are input in a time-sharing system, pixel block data for each of the images can be output.

* * * * *